United States Patent
Shechtman et al.

(10) Patent No.: US 8,355,592 B1
(45) Date of Patent: Jan. 15, 2013

(54) GENERATING A MODIFIED IMAGE WITH SEMANTIC CONSTRAINT

(75) Inventors: Eli Shechtman, Seattle, WA (US); Dan Goldman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 813 days.

(21) Appl. No.: 12/454,661

(22) Filed: May 21, 2009

(51) Int. Cl.
    *G06K 9/40* (2006.01)
(52) U.S. Cl. ........ 382/254; 345/419; 345/426; 345/473; 345/582; 345/619; 345/629; 345/661; 382/162; 382/235; 382/268; 382/276; 382/282; 382/284; 382/300; 600/407
(58) Field of Classification Search .................. None
    See application file for complete search history.

(56) References Cited

U.S. PATENT DOCUMENTS

| | | | |
|---|---|---|---|
| 6,018,592 | A | 1/2000 | Shinagawa et al. |
| 6,263,088 | B1 | 7/2001 | Crabtree et al. |
| 6,347,152 | B1 | 2/2002 | Shinagawa et al. |
| 7,760,912 | B2 | 7/2010 | Dana et al. |
| 7,773,099 | B2 * | 8/2010 | Forlines et al. ............... 345/629 |
| 8,131,113 | B1 * | 3/2012 | Jin ................................. 382/284 |
| 8,139,850 | B2 | 3/2012 | Maxwell et al. |
| 8,139,867 | B2 | 3/2012 | Maxwell et al. |
| 2003/0099406 | A1 * | 5/2003 | Georgiev et al. ............... 382/268 |
| 2004/0164996 | A1 * | 8/2004 | Criminisi et al. ............. 345/619 |
| 2005/0128210 | A1 * | 6/2005 | Berger ........................... 345/582 |
| 2005/0128211 | A1 * | 6/2005 | Berger et al. .................. 345/582 |
| 2005/0220348 | A1 | 10/2005 | Chiu et al. |
| 2006/0094951 | A1 * | 5/2006 | Dean et al. .................... 600/407 |
| 2006/0120624 | A1 | 6/2006 | Jojic et al. |
| 2006/0284874 | A1 * | 12/2006 | Wilson .......................... 345/473 |
| 2006/0285762 | A1 | 12/2006 | Sun et al. |
| 2007/0002039 | A1 * | 1/2007 | Pendleton et al. ............ 345/419 |
| 2007/0025637 | A1 * | 2/2007 | Setlur et al. ................... 382/276 |
| 2008/0074421 | A1 * | 3/2008 | Hayes ............................ 345/426 |
| 2008/0112642 | A1 | 5/2008 | Matsushita et al. |
| 2008/0238945 | A1 | 10/2008 | Wakizaka |

(Continued)

OTHER PUBLICATIONS

Barnes, et al., "Supplementary Material for The Generalized PatchMatch Correspondence Algorithm", Downloaded from the internet at http://www.cs.princeton.edu/gfx/pubs/Barnes_2010_TGP/index.php on Sep. 9, 2010, 6 pages.

(Continued)

*Primary Examiner* — Tsung-Yin Tsai
(74) *Attorney, Agent, or Firm* — Fish & Richardson P.C.

(57) ABSTRACT

A computer-implemented method for generating a modified image includes initiating, in a computer device, a patch-based optimization algorithm for using a first image to generate a second image. The method includes identifying, in a computer device, a first feature of a first image. The identification corresponds to a constraint on the first feature for generating a second image, The constraint restricts at least one of location and geometric orientation in the second image of patches representing the first feature. The method includes identifying, using the computer device, contents for the second image by processing patches in the image in iterations of the patch-based optimization algorithm. The patch-based optimization algorithm complies with the constraint, The method includes generating the second image from the identified contents based on the iterations of the patch-based optimization algorithm. The second image includes a second feature generated to represent the first feature and complying with the constraint.

31 Claims, 5 Drawing Sheets
(3 of 5 Drawing Sheet(s) Filed in Color)

U.S. PATENT DOCUMENTS

| | | | |
|---|---|---|---|
| 2008/0292162 A1 | 11/2008 | Gering et al. | |
| 2009/0141992 A1* | 6/2009 | Coulombe et al. | 382/235 |
| 2009/0180713 A1* | 7/2009 | Bucha et al. | 382/300 |
| 2010/0183242 A1* | 7/2010 | Brand | 382/282 |
| 2010/0328352 A1* | 12/2010 | Shamir et al. | 345/661 |
| 2011/0182502 A1* | 7/2011 | Liang | 382/162 |

OTHER PUBLICATIONS

Barnes, et al., "The Generalized PatchMatch Correspondence Algorithm", Downloaded from the internet at http://www.cs.princeton.edu/gfx/pubs/Barnes_2010_TGP/index.php on Sep. 9, 2010, 14 pages.

Lin, et al. "Random Forests and Adaptive Nearest Neighbors", Technical Report No. 1055, Downloaded from the interne on Sep. 7, 2010 at www.stat.wisc.edu/Department/techreports/tr1081.pdf; May 29, 2002, 31 pages.

'phpFlickr' [online] "phpFlickr version 3.1," Jan. 2011, [retrieved on Jan. 26, 2012]. Retrieved from the Internet: <URL: http://phpflickr.com>. 4 pages.

'Web-Archive' [online] "Creative Commons," 2010, [retrieved on Jan. 26, 2012]. Retrieved from Internet: <URL: http://web.archive.org/web/20100130095204/http:/creativecommons.org/> . 3 pages.

'Wikipedia' [online] "Java (programming language)," 2002, [retrieved on Jan. 27, 2012]. Retrieved from the Internet: <URL: http://en.wikipedia.org/w/index.php?title=Java_(programming_language)&oldid=550214>. 7 pages.

'Wikipedia' [online]. "OpenGL," Dec. 2004, [retrieved on Jan. 27, 2012]. Retrieved from the Internet: <URL: http://en.wikipedia.org/w/index.php?title=OpenGL&oldid=9281664>. 3 pages.

Baker, S. and Kanade, T. "Limits on Super-Resolution and How to Break Them." IEEE Transactions on Pattern Analysis and Machine Intelligence, vol. 24, No. 9, Sep. 2002, 36 pages.

Bay et al. "SURF: Speeded Up Robust Features." Computer Vision and Image Understanding (CVIU), vol. 110, No. 3, 2008, 14 pages.

Boiman et al. "In Defense of Nearest-Neighbor Based Image Classification." Academic Paper, The Weizmann Institute of Science, Jun. 2008, 8 pages.

Chang et al. "Super-Resolution Through Neighbor Embedding." Computer Vision and Pattern Recognition, 2004. CVPR 2004. Proceedings of the 2004 IEEE Computer Society Conference, Jul. 2004, 8 pages.

Chen et al. "Sketch2Photo: Internet Image Montage." ACM Transactions on Graphics (TOG)—Proceedings of ACM SIGGRAPH Asia 2009, Dec. 2009, 10 pages.

Dale et al. "Image Restoration using Online Photo Collections." Proc. IEEE Conference on Computer Vision, Sep. 2009, 8 pages.

Eisemann et al. "Photo Zoom: High Resolution from Unordered Image Collections." SIGGRAPH 2010, Los Angeles, California, May 2010, 1 page.

HaCohen et al. "Image Upsampling via Texture Hallucination." IEEE International Conference on Computational Photography, Mar. 2010, 8 pages.

Han et al. "Multiscale Texture Synthesis." ACM Transactions on Graphics, vol. 27, No. 3, Aug. 2008, 8 pages.

Hays and Efros. "Scene Completion Using Millions of Photographs." SIGGRAPH 2007, San Diego, California, Aug. 2007, 7 pages.

Johnson et al. "CG2Real: Improving the Realism of Computer Generated Images Using a Large Collection of Photographs." IEEE Transactions on Visualization and Computer Graphics, vol. 17, No. 6, Sep. 2011, 13 pages.

Kaneva et al. "Infinite Images: Creating and Exploring a Large Photorealistic Virtual Space." Proceeding of the IEEE, vol. 98, No. 8, Aug. 2010, 17 pages.

Kirkpatrick et al. "Optimization by Simulated Annealing." Science, vol. 220, No. 4598, May 1983, 10 pages.

Liu et al. "Face Hallucination: Theory and Practice." International Journal of Computer Vision (IJCV), vol. 75, No. 1, Oct. 2007, 33 pages.

Lowe, D.G. "Object Recognition from Local Scale-Invariant Features." Computer Vision, 1999. The Proceedings of the Seventh IEEE International Conference, Kerkyra, Greece, Sep. 1999, 8 pages.

Miranda et al. "New Routes from Minimal Approximation Error to Principal Components." Neural Processing Letters, vol. 27, No. 3, Jun. 2008, 14 pages.

Pandey et al. "Nearest-Neighbor Caching for Content-Match Applications." International World Wide Web Conference Committee (IW3C2), Madrid, Spain, Apr. 2009, 10 pages.

Peterson, J. L. "Computer Programs for Detecting and Correcting Spelling Errors." Computing Practices: Communications of the ACM, vol. 23, No, 12, Dec. 1980, 12 pages.

Snavely et al. "Photo Tourism: Exploring Photo Collections in 3D." ACM Transactions on Graphics (SIGGRAPH Proceedings), vol. 25, No. 3, Jul. 2006, 12 pages.

Wang et al. "Factoring Repeated Content Within and Among Images." ACM Trans. on Graphics (SIGGRAPH), vol. 27, No. 3, Aug. 2008, 10 pages.

Webb, A. R. "Chapter 6. Nonlinear Discriminant Analysis—Projection Methods." Statistical Pattern Recognition, Jul. 2009, 22 pages.

Agarwala, A., Dontcheva, M., Agrawala, M., Drucker, S., Colburn, A., Curless, B., Salesin, D., and Cohen, M., "Interactive digital photomontage", *ACM Trans. Graph.* 23, 3, pp. 294-302, dated 2004.

Ashikhmin, M., "Synthesizing natural textures", in *I3D '01 Proceedings of the 2001 symposium on Interactive 3D graphics*, ACM, New York, NY, USA, pp. 217-226, dated 2001.

Arya, S., Mount, D., Netanyahu, N., Silverman, R., and Wu, A., "An optimal algorithm for approximate nearest neighbor searching in fixed dimensions", in *Proc. Fifth Symp. Discrete Algorithms (SODA)*, pp. 573-582, dated 1994.

Avidan, S., and Shamir, A., "Seam carving for content-aware image resizing", in *ACM Trans. Graph.* 26, 3, 10, dated 2007.

Bertalmio, M., Sapiro, G., Caselles, V., and Ballester, C., "Image inpainting", in *SIGGRAPH '00: Proceedings of the 27th annual conference on computer graphics and interactive techniques*, ACM Press/Addison-Wesley Publishing Co., New York, NY, USA, pp. 417-424, dated 2000.

Bourdev and Brandt, "Robust Object Detection Via Soft Cascade" in *Proceedings from CVPR 2005, IEEE Computer Society*, pp. 2236-2243.

Boykov, Y., Veksler, O., and Zabih, R., "Fast approximate energy minimization via graph cuts", in *Pattern Analysis and Machine Intelligence, IEEE Transactions on 23*,11 (Nov.), pp. 1222-1239, dated 2001.

Buades, A., Coll, B., and Morel, J.M. 2005. A non-local algorithm for image denoising. In *Computer Vision and Pattern Recognition, 2005. CVPR 2005. IEEE Computer Society Conference on*, vol. 2, 60-65 vol.

Cho, T. S., Butman, M., Avidan, S., and Freeman, W., "The patch transform and its applications to image editing", in *Computer Vision and Pattern Recognition, 2008. CVPR 2008. IEEE Conference on* (June), pp. 1-8, dated 2008.

Criminisi, A., Perez, P. and Toyama, K. 2003. Object removal by exemplar-based inpainting. *Computer Vision and Pattern Recognition IEEE Computer Society Conference on 2*, 721.

Criminisi, A., Perez, P., and Toyama, K., "Region filling and object removal by exemplar-based image inpainting", in *IEEE Trans. Image Processing 13, 9* (Sept.),p. 1200-1212, dated 2004.

Datar, Immorlica, Indyk, and Mirrokni, "Locality-sensitive hashing scheme based on p-stable distributions", in *COMPGEOM: Annual ACM Symposium on Computational Geometry*, dated 2004.

Drori, I., Cohen-or, D., and Yeshurun, H. 2003. Fragment-based image completion. *ACM Transactions on Graphics* 22, 303-312.

Efros, A. A., and Freeman, W.T., "Image quilting for texture synthesis and transfer", in *SIGGRAPH 2001, Computer Graphics Proceedings*, ACM Press/ACM SIGGRAPH, E. Fiume, Ed., pp. 341-346, dated 2001.

Efros, A. A., and Leung, T. K., "Texture synthesis by non-parametric sampling", in *Computer Vision, IEEE International Conference on 2*, p. 1033, dated 1999.

Fischler, M.A., and Bolles, R.C. 1981. Random sample consensus: a paradigm for model fitting with applications to image analysis and automated cartography. *Commun. ACM 24*, 6, 381-395.

Fitzgibbon, A., Wexler, Y., and Zisserman, A. 2003. Image-based rendering using image-based priors. In *ICCV '03: Proceedings of the*

Ninth IEEE International Conference on Computer Vision, IEEE Computer Society, Washington, DC, USA 1176.

Freeman, W. T., Pasztor, E. C., and Y, O. T. C., "Learning low-level vision", in *International Journal of Computer Vision 40*, dated 2000.

Freeman, W., Jones, T., and Pasztor, E. 2002. Example-based super-resolution. *Computer Graphics and Applications, IEEE 22.2* (Mar./Apr.) 56-65.

Hertzmann, A., Jacobs, C. E., Oliver, N., Curless, B., and Salesin, D., "Image analogies", in *SIGGRAPH*, pp. 327-340, dated 2001.

Komodakis, N., and Tziritas, G., 2007. Image completion using efficient belief propagation via priority scheduling and dynamic pruning *IEEE Transactions on Image Processing 16*, 11 2649-2661.

Kopf, J., Fu, C.-W., Cohen-or, D., Deussen, O., Lischinski, D., and Wong, T.-T. 2007. Solid texture synthesis from 2d exemplars *ACM Transactions on Graphics (Proceedings of SIGGRAPH 2007)* 26, 3, 2:1-2:9.

Kumar, N., Zhang, L., and Nayar, S.K., "What is a good nearest neighbors algorithm for finding similar patches in images?", in *European Conference on Computer Vision, II*: pp. 364-378, dated 2008.

Kwatra, V., Essa, I., Bobick, A., Kwatra N., "Texture optimization for example-based synthesis", in *ACM Trans. Graph.*, 24(3): pp. 795-802, dated 2005.

Kwatra V., Schdl, A., Essa, I., Turk, G., and Bobick, A., "Graphcut textures: Image and video synthesis using graph cuts", in *ACM Transactions on Graphics, SIGGRAPH 2003* 22, 3 (July), pp. 277-286, dated 2003.

Lefebvre, S., and Hoppe, H., "Parallel controllable texture synthesis", in *ACM Trans. Graph 24, 3*, pp. 777-786, dated 2005.

Liang, L., Liu, C., Xu, Y.-Q., Guo, B., and Shum, H.-Y., "Real-time texture synthesis by patch-based sampling" in *ACM Trans. Graph. 20, 3*, pp. 127-150, dated 2001.

Liu, F., and Gleicher, M., "Automatic image retargeting with fisheye-view warping", in *UIST, ACM*, P. Baudisch, M. Czerwinski and D.R. Olsen, Eds., pp. 153-162, dated 2005.

Liu, X., Mei, T., Hua, X.-S., Yang, B., and Zhou, H.-Q., "Video Collage", in *MM'07*, pp. 461-462, dated 2007.

Mikolajczyk, K., and Matas, J. G., "Improving descriptors for fast tree matching by optimal linear projection", in *International Conference on Computer Vision*, pp. 1-8, dated 2007.

Mount, D.M., and Arya, S., "ANN: A library for approximate nearest neighbor searching", dated Oct. 28, 1997.

Pavic, D., Schonefeld, V., and Kobbelt, L. 2006. Interactive image completion with perspective correction. *The Visual Computer 22* (September), 671-681(11).

Rong, G., and Tan, T.-S., "Jump flooding in gpu with applications to voronoi diagram and distance transform", in *I3D '06: Proceedings of the 2006 symposium on Interactive 3D graphics and games*, ACM, New York, NY, USA, pp. 109-116, dated 2006.

Rother, C., Kumar, S., Kolmogorov, V., and Blake, A., "Digital tapestry", in *IEEE Computer Vision and Pattern Recognition or CVPR, I*, pp. 589-596, dated 2005.

Rother, C., Bordeaux, L., Hamadi, Y., and Blake, A., "Autocollage", in *ACM Trans. Graph 25, 3*, pp. 847-852, dated 2006.

Rubinstein, M., Shamir, A., and Avidan, S., "Improved seam carving for video retargeting", in *ACM Transactions on Graphics (SIGGRAPH)* 27, 3, dated 2008.

Setlur, V., Takagi, S., Raskar, R., Gleicher, M., and Gooch, B., "Automatic image retargeting", in *MUM, ACM*, M. Billinghurst, Ed., vol. 154 of *ACM International Conference Proceeding Series*, pp. 59-68, dated 2005.

Shiratori, T., Matsushita, Y., Tang, X., and Kang, S. B., "Video completion by motion field transfer", in *Computer Vision and Pattern Recognition, 2006 IEEE Computer Society Conference on 1* (June), pp. 411-418, dated Jun. 2006.

Simakov, D., Caspi, Y., Shechtman E., and Irani, M., "Summarizing visual data using bidirectional similarity", in *Proc. IEEE Conference on Computer Vision and Pattern Recognition (CVPR)*, pp. 1-8, dated 2008.

Sun, J., Yuan, L., Jia, J., and Shum, H.-Y. 2005. Image completion with structure propagation. In *SIGGRAPH '05: ACM SIGGRAPH 2005 Papers*, ACM New York, NY, USA 861-868.

Tong, X., Zhang, J., Liu, L., Wang, X., Guo, B., and Shum, H.-Y., "Synthesis of bidirectional texture functions on arbitrary surfaces", in *ACM Transactions on Graphics 21*, 3 (July), pp. 665-672, dated Jul. 2002.

Tourapis, A. M., "Enhanced predictive zonal search for single and multiple frame motion estimation", in *VCIP, SPIE*, C. C. J. Kuo, Ed., vol. 4671 of *Proceedings of SPIE*, pp. 1069-1079, dated 2002.

Wang, T., Mei, T., Hua, X.-S., Liu, X., and Zhou, H.-Q., "Video collage: A novel presentation of video sequence", in *ICME, IEEE*, pp. 1479-1482, dated 2007.

Wang, Y.-S., Tai, C.-L., Sorkine, O., and Lee, T.-Y. 2008. Optimized scale-and-stretch for image resizing. In *SIGGRAPH Asia '08:ACM SIGGRAPH Asia 2008 papers*, ACM, New York, NY, USA 1-8.

Wei, L. Y., and Levoy, M., "Fast texture synthesis using tree-structured vector quantization", in *SIGGraph-00*, pp. 479-488, dated 2000.

Wei, L.-Y., Han, J., Zhou, K., Bao, H., Guo, B., and Shum, H.-Y., "Inverse texture synthesis", in *ACM Trans. Graph 27, 3*, pp. 1-9, dated 2008.

Wexler, Y., Shechtman, E., and Irani, M., "Space-time video completion", in *Computer Vision and Pattern Recognition, IEEE Computer Society Conference on 1*, pp. 120-127, dated 2004.

Wexler, Y., Shechtman, E., and Irani, M., "Space-time completion of video", in *IEEE Trans. Pattern Analysis and Machine Intelligence 29, 3*, (Mar.), pp. 463-476, dated Mar. 2007.

Wolf, L., Guttmann, M., and Cohen-or, D. 2007. Non-homogeneous content-driven video-retargeting. In *Proceedings of the Eleventh IEEE International Conference on Computer Vision (ICCV-07)*.

Yianilos, P.N., "Data structures and algorithms for nearest neighbor search in general metric spaces", in *SODA*, pp. 311-321, dated 1993.

"AutoCollage" [online] Microsoft Research 2008, [retrieved on Nov. 26, 2008]. Retrieved from he Internet: <URL: http://research.microsoft.com/autocollage/>.

\* cited by examiner

GENERATING A MODIFIED IMAGE WITH SEMANTIC CONSTRAINT

RELATED APPLICATIONS

This application is a utility patent application and claims priority to U.S. Provisional Application Ser. No. 61/215,464, filed May 6, 2009 entitled "GENERATING A MODIFIED IMAGE WITH SEMANTIC CONSTRAINT," and the entire contents of which are incorporated herein by reference.

BACKGROUND

This specification relates to digital image processing.

Some existing image processing techniques use patch-based techniques for manipulating content. The processing can involve analyzing or synthesizing patches (e.g., pixel groups) of image content. For example, patch-based approaches are used in denoising image and video content; enhancing image resolution such as performing super-resolution; compressing image content; changing image aspect ratio such as by retargeting; editing image content; and performing texture synthesis. For example, a bidirectional similarity can be evaluated based on a patch distance metric. A bidirectional similarity computation can involve calculating nearest neighbor patches, which can be computationally demanding. Some digital image editing tools use nearest neighbor searches for modifying images.

Patch-based methods can have benefits for synthesis operations. For example, structure, texture, repetitive patterns and redundancies can be treated well. As with other local methods, patch-based processing can lead to global inconsistencies or deformations.

SUMMARY

The invention relates to generating a modified image using constraint restricting location or geometric orientation.

In a first aspect, a computer-implemented method for generating a modified image includes initiating, in a computer device, a patch-based optimization algorithm for using a first image to generate a second image. The method includes identifying, in a computer device, a first feature of a first image. The identification corresponds to a constraint on the first feature for generating a second image, The constraint restricts at least one of location and geometric orientation in the second image of patches representing the first feature. The method includes identifying, using the computer device, contents for the second image by processing patches in the image in iterations of the patch-based optimization algorithm. The patch-based optimization complies with the constraint, The method includes generating the second image from the identified contents based on the iterations of the patch-based optimization algorithm. The second image includes a second feature generated to represent the first feature and complying with the constraint.

Implementations can include any or all of the following features. The method can further include displaying the first image to a user using the computer device; and receiving an input from the user that marks the first feature in the first image, wherein the first feature is identified based on the input. The first feature can be automatically identified in the first image without explicit user input. The method can further include receiving an input from the user that modifies the constraint; and wherein the second image is generated based also on the input.

The patch-based optimization process can include fitting a parametric model to the patches and iteratively performing projections using the model to fix locations in the second image for at least some of the patches. The first feature can include a straight line and the constraint can comprise that the second feature include at least part of the straight line. The constraint and the parametric model may not restrict a translation and a slope of the straight line in the second image with regard to the first image. The constraint and the parametric model can restrict the straight line in the second image to have a same slope as in the first image, and the constraint and the parametric model may not restrict a translation of the straight line in the second image with regard to the first image. The input can further specify a location where to place the second feature in the second image, and the constraint and the parametric model can restrict the straight line in the second image to have a same slope as in the first image. The first feature can include a region of the first image, and the constraint and the parametric model can provide that the region is translated to a location in the second image without any deformation.

The first feature can include a parametric-equation line, and the constraint can define a parametric equation for the second feature. The constraint can include that the second feature is generated by a uniform scaling of the first feature. The constraint can include that the second feature is generated by a non-uniform scaling of the first feature that changes at least one proportion of the first feature and does not change at least one other proportion of the first feature. The first image can include also a third feature for which a corresponding fourth feature is included in the second image, and the constraint can include that the second and fourth features are generated by a common scaling of the first and third features, respectively. The constraint can restrict the second feature to be an affine transformation of the first feature. The constraint can specify an aspect of the second feature based on the first feature. The constraint can include at least one selected from: the shape of the first feature is an arbitrary curve and the shape of the second feature is a straight line; the shape of the first feature is a straight line and the shape of the second feature is an arbitrary curve; the shape of the first feature is an arbitrary curve and the shape of the second feature is a different arbitrary curve; the second feature corresponds to at most a pre-defined amount of distortion of the first feature; the second feature corresponds to a nonlinear transformation of the first feature; and definition of an epipole point in the second image through which point all parallel lines or their continuations should pass.

Identifying the contents for the second image can include: identifying each second-image point in the second image for which the patch-based optimization process identifies a first-image point in the first feature; computing the second feature in the second image based on the identified second-image points; and projecting the identified second-image points to the second feature in the second image. The first feature can include a straight line and identifying the contents for the second image can further include determining a three-vector for the straight line; and ensuring that a dot product of the three-vector and all points in the second feature equals zero. The first feature can include a region and identifying the contents for the second image can further include determining a homography transformation of each point in the first feature; and ensuring that a distance between: (i) the homography transformations of all points in the first feature equal to points in the second image, and (ii) all points in the second feature equals zero. The second image can include a retargeting of the first image. The constraint can limit available locations in the second image for placing the patches of the first feature.

The patch-based optimization algorithm can include (1) initializing the second image to be equal to the first image; (2) subsampling the first and second images to a coarsest resolution; (3) resizing, at the coarsest resolution, the second image by a scale factor using linear interpolation; (4) computing a nearest-neighbor field in at least one of (i) a direction from the first image to the second image and (ii) a direction from the second image to the first image; (5) fitting a parametric model to the patches and their nearest-neighbor locations, and performing projections using the parametric model to fix locations in the second image for at least some of the patches; (6) computing a new second image by copying and averaging colors from nearest-neighbor patches; (7) repeating steps (4)-(6) until a convergence criterion is met; (8) repeating, at the coarsest resolution, steps (3)-(7) until a desired output ratio of the second image is reached; and (9) upscaling to a finer resolution and repeating steps (3)-(8) until reaching an original resolution of the first image. The second image can represent a reshuffling of the first image. The patch-based optimization algorithm can include (1) initializing the second image to be equal to the first image; (2) subsampling the first and second images to a coarsest resolution; (3) reshuffling, at the coarsest resolution, the second image; (4) computing a nearest-neighbor field in at least one of (i) a direction from the first image to the second image and (ii) a direction from the second image to the first image; (5) fitting a parametric model to the patches and their nearest-neighbor locations, and performing projections using the parametric model to fix locations in the second image for at least some of the patches; (6) computing a new second image by copying and averaging colors from nearest-neighbor patches; (7) repeating steps (4)-(6) until a convergence criterion is met; and (8) upscaling to a finer resolution and repeating steps (3)-(7) until reaching an original resolution of the first image. The second image can represent an image warping of the first image that preserves texture of the first image. The patch-based optimization algorithm can use patches of the first image that have more than one size.

The method can be implemented using a computer program product tangibly embodied in a tangible program carrier and comprising instructions that when executed by a processor perform the method.

In a second aspect, a graphical user interface includes an image display area displaying to a user a first image that is to be used in generating a second image that represents the first image. The graphical user interface includes an input control for the user to generate an input that marks a first feature of the first image. The input represents a constraint on the first feature for generating the second image. The constraint restricts at least one of location and geometric orientation in the second image of patches representing the first feature. Contents for the second image are identified using a patch-based optimization algorithm applied to patches in the image, the patch-based optimization algorithm complying with the constraint, and the second image is generated using the identified contents, the second image including a second feature generated to represent the first feature and complying with the constraint.

The graphical user interface can be implemented using a computer program product tangibly embodied in a tangible program carrier and comprising instructions that when executed by a processor generate the graphical user interface.

Implementations can include any or all of the following features. The first feature can include a straight line, and the input control can include a drawing tool with which the user marks the straight line representing the constraint. The first feature can include a region of the first image, and the input control can include a drawing tool with which the user marks the region representing the constraint.

Particular embodiments of the subject matter described in this specification can be implemented to realize one or more of the following advantages. Image retargeting can be improved. A user-defined constraint can be generated for a patch-based optimization process. Semantics in source images can be preserved by a user making inputs to mark the features in the images. A constraint can be generated automatically or semi-automatically for an input image and be taken into account in generating an output image. Image distortions can be corrected or created (e.g., for artistic effect) while preserving texture.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1:
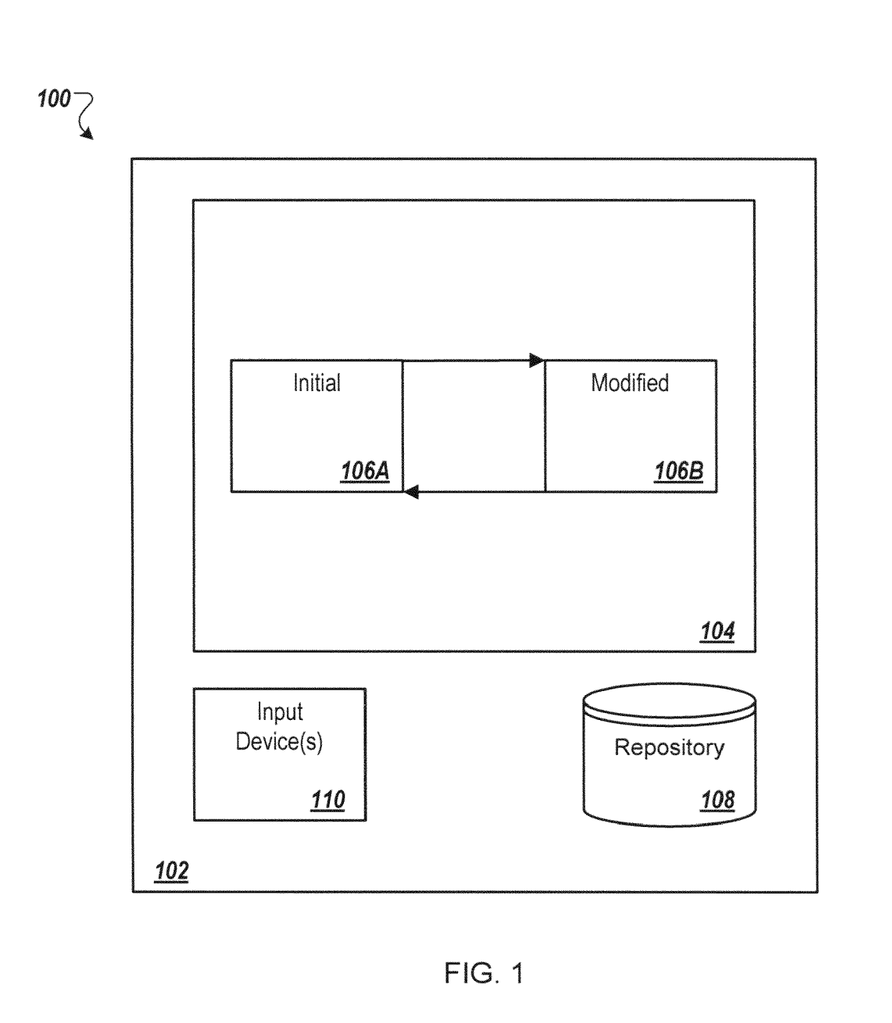
FIG. 1 shows an example system that can generate a modified image.

FIG. 1 shows an example system 100 that can generate a modified image. The system 100 includes a computer device 102, which can be any processor-based device including, but not limited to, a personal computer, a server device, a workstation or a handheld device.

The system 100 includes a graphical user interface (GUI) 104 that here is generated by the computer device 102. For example, the GUI 104 can be displayed on a monitor or other display device connected to the computer device. The GUI 104 is used in the manipulation if images, such as to show a user an initial image 106A and/or a modified image 106B.

The system 100 includes at least one repository 108, which can be implemented using any technology suitable for storing data, such as in form of a memory, a hard drive, or an optical disk, to name a few examples. The repository 108 can contain one or more images, for example images that have not been modified and/or modified images. The system 100 can make one or more images in the repository 108 available to a user, for example by displaying the image(s) in the GUI 104.

The system 100 includes at least one input device 110, such as a keyboard, mouse, pointing device, trackball, joystick, track pad, or any other device with which a user can control and/or respond to the computer device 102. The user can make an input to affect image processing, such as to apply one or more constraints for the modification.

The system 100 can be used for any of a number of purposes, such as for retargeting an image, which will be used as an illustrative example below. Other applications include, but are not limited to: reshuffling of image content and performing local warps, scales or rotations.

The initial image 106A can be retargeted to another aspect ratio, and this results in the modified image 106B. For example, image retargeting can be used in high-level editing of digital photographs or video. The retargeting can involve selectively removing information from, and/or adding information to, the initial image.

An image modification process can be performed using patch-based optimization subject to at least a coherence criterion. A patch-based optimization algorithm is described in WEXLER, Y., SHECHTMAN, E., AND IRANI, M., Space-time completion of video, IEEE Trans. PAMI Vol. 29, No. 3 (March 2007), 463-476, the entire contents of which are incorporated herein by reference.

The modified image 106B can be generated from the initial image 106A using a patch-based optimization algorithm. The patch-based optimization algorithm can be applied to a patch in the initial image 106A (e.g., to a predetermined number of pixels such as a 5×5 pixel patch). A nearest neighbor field can be determined that maps each patch coordinate in the initial image 106A to a two-dimensional offset space. The offset represents the adjustment in patch coordinates between the patch in the initial image and the corresponding patch in the modified image. For example, an initial patch a in the initial image has a nearest-neighbor patch b in the modified image. The nearest-neighbor field f is then defined as $$f(a)=b-a$$

The offset values of the nearest-neighbor field can be stored in an array. For example, the array can have the same dimensions as the initial image.

The patch-based optimization algorithm begins with an initial set of offsets. Next, an iterative update based on the initial offsets is applied to the nearest-neighbor field. In each iteration, good patch offsets are propagated to neighboring patches, and a random search is performed in the neighborhood of the best offset.

The initial offsets can be generated by randomly assigning values to the offset field, or by using prior information. In a gradual image resizing process, an initial guess from a previous level can be available for use at the present level. For example, a few iterations of the algorithm can be performed based on a random initialization, and this can then be merged with the available initial guess before remaining iterations are performed.

In the iterative process, patch offsets can be examined in scan order throughout the offset array. Each iteration includes a propagation step and a random-search step. In the propagation step, assume that a mapping f(x,y) is being examined. The nearby mappings f(x−1,y) and f(x,y−1) will be used to improve the mapping f(x,y). For example, if f(x−1,y) is a good mapping the process will attempt to use it for (x,y). In some iterations, such as in every other one, the offsets can be examined in reverse order so that information about offset/mapping quality is propagated in an opposite direction.

Mappings can be evaluated using a patch distance function. Any distance function can be used. Some implementations can use common distance functions for natural images and/or other data sources including video and three-dimensional shapes, such as an $L_p$, $L_1$, or clamped $L_2$, etc., or any other scalar function. In some implementations, the patch distance function D is selected such that the optimal offsets for neighboring overlapping patches have a high probability of being similar. The higher this probability, the faster the algorithm converges.

In the random-search step, the process attempts to improve a mapping f(x,y) by randomly searching within the modified image for a better mapping (i.e., for a target patch whose distance metric to the source patch is lower). In some implementations, patches at successively decreasing distance from the target patch can be evaluated. For example, a uniform random selection of direction chosen in the field [−1,1]×[−1,1] is selected, and an exponential function is used to decrease the distance from a maximum pixel radius w. If a better mapping is found in the random search, it is substituted for the current mapping.

The iterations are halted when a criterion is met. In some implementations, the criterion is whether the fraction of modified offsets falls below a threshold. In some implementations, a fixed number of iterations is used, for example five. Performing the nearest-neighbor process generates the modified image 106B so that it corresponds to the initial image 106A. For example, the modified image can be a retargeted version of the initial image.

In some implementations, a bidirectional similarity measure can be used, for example one that finds good correspondences between image regions in both directions (e.g., from a patch in the initial image 106A to a patch in the modified image 106B, and vice versa). For example, if the image regions are sufficiently similar, an existing bi-directional similarity method can converge to a partially continuous solution, with many salient regions copied to the output with minimal distortions. For example, most offsets of nearby patches in the source image may be nearly identical. As another example, if the image regions are not particularly similar, then the true bi-directional similarity may likely be close to a similarity of random patches within the images.

A bidirectional similarity measure can use a completeness criterion and a coherence criterion. A completeness criterion for image retargeting relates to whether all patches in the initial image are represented in the modified image. For example, if the initial image contains multiple identical patches, the completeness criterion specifies that at least one of the patches should be found in the modified image. In contrast, if a unique patch in the initial image lacks any corresponding patch in the modified image then the completeness criterion is not satisfied.

A coherence criterion for image retargeting relates to whether all patches in the modified image originate from the initial image. For example, each patch in the modified image should have at least one corresponding patch in the initial image. In contrast, if a patch in the modified image lacks any corresponding patch in the initial image then the coherence criterion is not satisfied.

Examples of bidirectional similarity calculations are described in SIMAKOV, D., CASPI, Y., SHECHTMAN, E., and IRANI, M. 2008, Summarizing visual data using bidirectional similarity. In Computer Vision and Pattern Recognition, CVPR 2008. IEEE Conference.

A nearest-neighbor algorithm can be performed iteratively in an inner loop of a bidirectional or unidirectional similarity algorithm, for example to perform retargeting. Thus, the similarity algorithm can involve:

(1) initializing the modified image 106B to be equal to the initial image 106A.

(2) subsampling the initial and modified images to a coarsest resolution.

(3) resizing, at the coarsest resolution, the modified image by a scale factor using linear interpolation. For example, a small scale factor of about 0.97× can be used.

(4) computing a nearest-neighbor field in both a direction from the initial image to the modified image (i.e., using a coherence term) and a direction from the modified image to the initial image (i.e., using a completeness term).

(5) fitting a parametric model to the patches and their nearest-neighbor locations, and performing projections using the parametric model to fix locations in the second image for at least some of the patches;

(6) computing a new second image by copying and averaging colors from nearest-neighbor patches. In some implementations, this can be considered a voting process. For example, patch averaging/clustering for finding the colors in each iteration could be done also in the gradient domain, to cope with some color variations, such as due to illumination changes within the image.

(7) repeating steps (4)-(6) until a convergence criterion is met;

(8) repeating, at the coarsest resolution, steps (3)-(7) until a desired output ratio of the second image is reached; and (9) upscaling to a finer resolution and repeating steps (3)-(8) until reaching an original resolution of the first image.

In other implementations, unidirectional similarity algorithm can be used, for example containing only a coherence or only a completeness term. That is, in step (3) above, the coherence term but not the completeness term would be used.

Some implementations involve other image processing techniques. For example: the initial image 106A can be reshuffled to generate the modified image 106B and local warps, scales or rotations can be performed on the initial image 106A to generate the modified image 106B. In any or all of such processes, patch-based processing can be performed with the aid of one or more semantic constraints (e.g., a marked line that is to remain straight). For reshuffling, step (3) in the above operations can be replaced with a step of reshuffling the initial guess. This can involve cutting-and-pasting, or copying-and-pasting, to fill in the hole, to name just two examples. Also, step (8) is removed as the reshuffling is performed in one step instead of in a loop.

Figure 2:
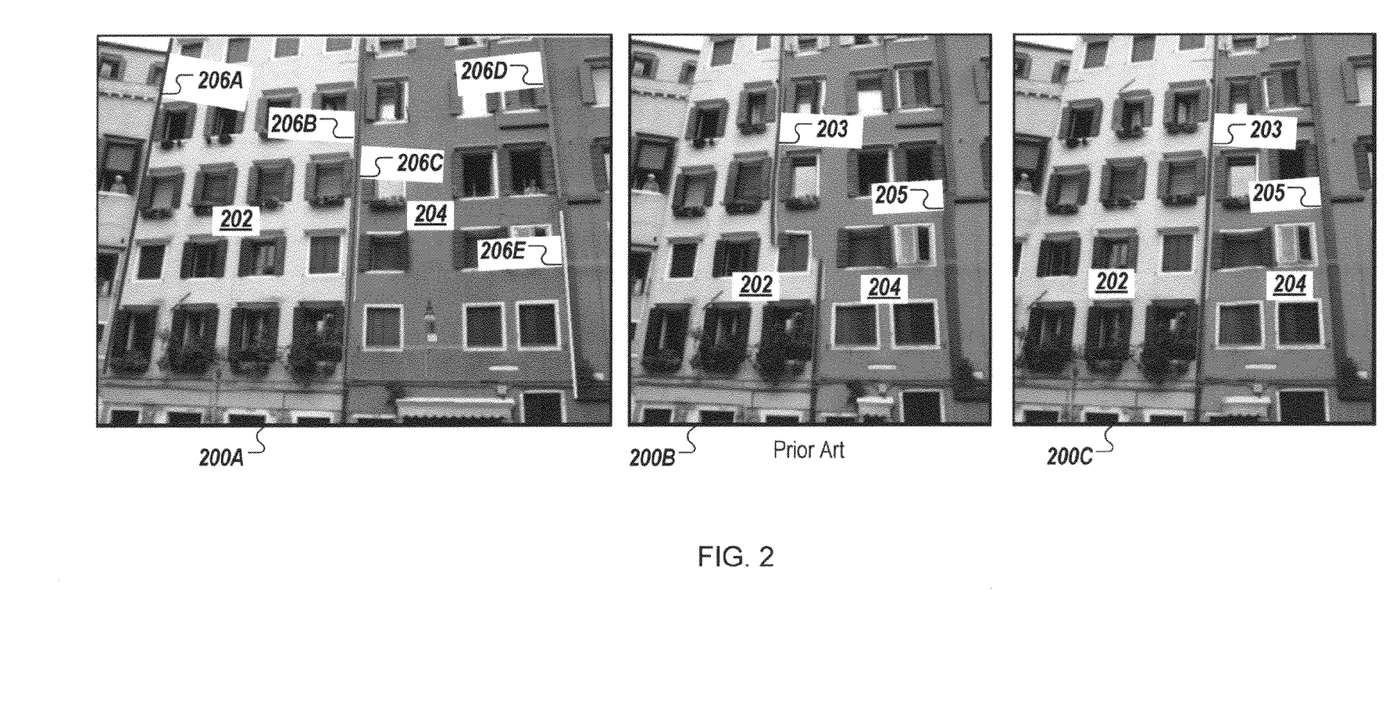
FIGS. 2-3 show example image modifications.

FIG. 2 shows an example of image modifications. Particularly, a source image 200A is retargeted in two ways: without defined constraints, resulting in target image 200B, and with semantic constraints, resulting in target image 200C. Here, the source image 200A shows facades of adjacent buildings 202 and 204. Ignoring the colored lines for now, the facades form straight boundaries (essentially vertical) between the buildings 202 and 204.

In the target image 200B, the retargeting results in a different aspect ratio than in the image 200A. This is accomplished by excluding selected contents from the initial image. For example, the buildings 202 and 204 are narrower than in the image 200A. Some artifacts appear in the image 200B: a boundary 203 between the buildings 202 and 204 is not continuous and an elongated façade element 205 that was straight in the initial image 200A has become somewhat curved in the image 200B. These artifacts occur because the nearest-neighbor process does not sufficiently restrict where patches can be placed. For example, patches that contain the upper part of the boundary 203 are placed significantly to the left of patches that contain the lower part of the boundary.

A viewer may find such artifacts irritating or they can complicate the viewer's understanding of what the image shows. To preserve semantic features such as linearity, the user can add one or more constraints to the nearest-neighbor process. Such constraints can restrict the location where patches for the feature are placed in the modified image, or the geometric orientation of such patches, or both.

Here, the user marks important features with lines 206A-E. Particularly, the user draws the line 206A along the left vertical edge of the building 202; the line 206B along the right edge of the building 202; the line 206C along the left edge of the building 204; and the lines 206D and E along the façade element 205. The lines 206A-E signify the constraint that the corresponding straight features of the initial image are to remain straight in the retargeted image. The constraint does not require the whole feature to be included in the retargeted image, but for the portion of it that is, this characteristic (e.g., a straight line) is preserved. That is, the constraint can define that the patches should be placed so that the semantic feature, such as a straight line, is not distorted.

The user can generate these markings in the GUI 104 using the input device 110, for example by clicking a cursor at an intended starting point of the line and thereafter clicking the cursor at an intended finishing point of the line.

The image 200C is generated using the nearest-neighbor process taking into account the user-defined constraints. In contrast to the image 200B, the image 200C contains an unbroken representation of the boundary 203 and a straight representation of the façade element 205. The initial characteristics of these image features are preserved because the locations of patch correspondences along these features are geometrically constrained. Accordingly, placing one or more markers in an image can allow the user to highlight important semantic image information that the user desires to be preserved while retargeting.

In the above example, a user controls and guides the constraint by marking the features that are to be preserved. In other implementations, a constraint can be defined automatically or semi-automatically. Thus, instead of being explicitly defined by the user, any or all of the lines 206A-E can be automatically applied by the system and taken into account in generating the image 200C.

For example, a detector can be applied to the input image to identify one or more straight lines therein. Based on the identification, a constraint can be applied to keep the line(s) straight in the target image. As another example, a face detection method can be used to automatically identify faces in the input image, such as to apply a non-deformation constraint or a uniform scaling constraint to the face. As another example, a task-specific detector can be developed and used, such as to detect a certain object or logo, or as a saliency detector to identify a feature that is distinct and representative of the input image.

In some implementations, the automatic constraint creation by a detector or corresponding component can be supplemented by one or more user actions, for a semi-automatic approach. For example, the system can automatically identify one or more features of interest and apply corresponding constraints thereto, as an initialization of the modification process. The result can be presented to a user for review and the user can add, delete or modify constraints as appropriate. For example, upon viewing the image 200C the user may decide that one of the lines 200A-E should not be constrained and can remove that line from the process; or, the user can add one or more other constraints to the image 200A. A new version of the image 200C can then be generated based on the constraint as revised by the user.

Figure 3:
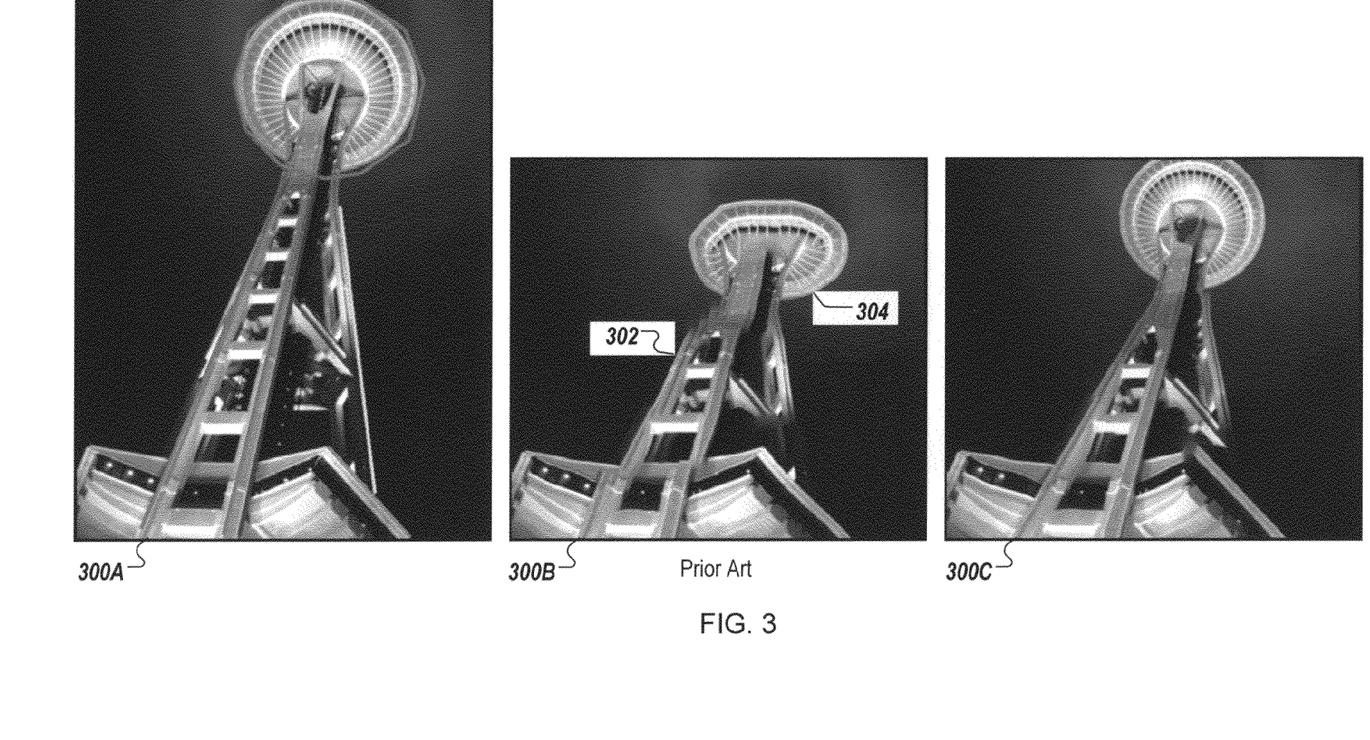

FIG. 3 shows another example of image modifications. Similarly to the above example, an image 300A is an initial image; image 300B is generated using a nearest-neighbor process without semantic constraints; and image 300C is generated using the nearest-neighbor process with semantic constraints. Here, the initial image 300A shows the Seattle Space Needle.

In the image 300B, a supporting leg 302 has a discontinuous and unnatural appearance. Also, an upper structure 304 that in reality is circular has assumed an awkward elliptical or oval shape. To avoid these and other artifacts, the user can place markings in the image 300A, such as lines for the legs and a circle around the upper structure. As another example, a constraint can be defined automatically or semi-automatically as described above. In image 300C, finally, the nearest-neighbor process has taken the semantic constraints into account and has retargeted the initial image to have straight legs and a circular upper structure. For example the circular structure at the top of the Space Needle was scaled down based on the applied constraint to leave room in the image 300C for other aspects of the building. That is, local scaling can be applied to a selected feature or region. Thus, semantic constraints can preserve important image content from inadvertently being lost or distorted in a retargeting process.

Figure 4:
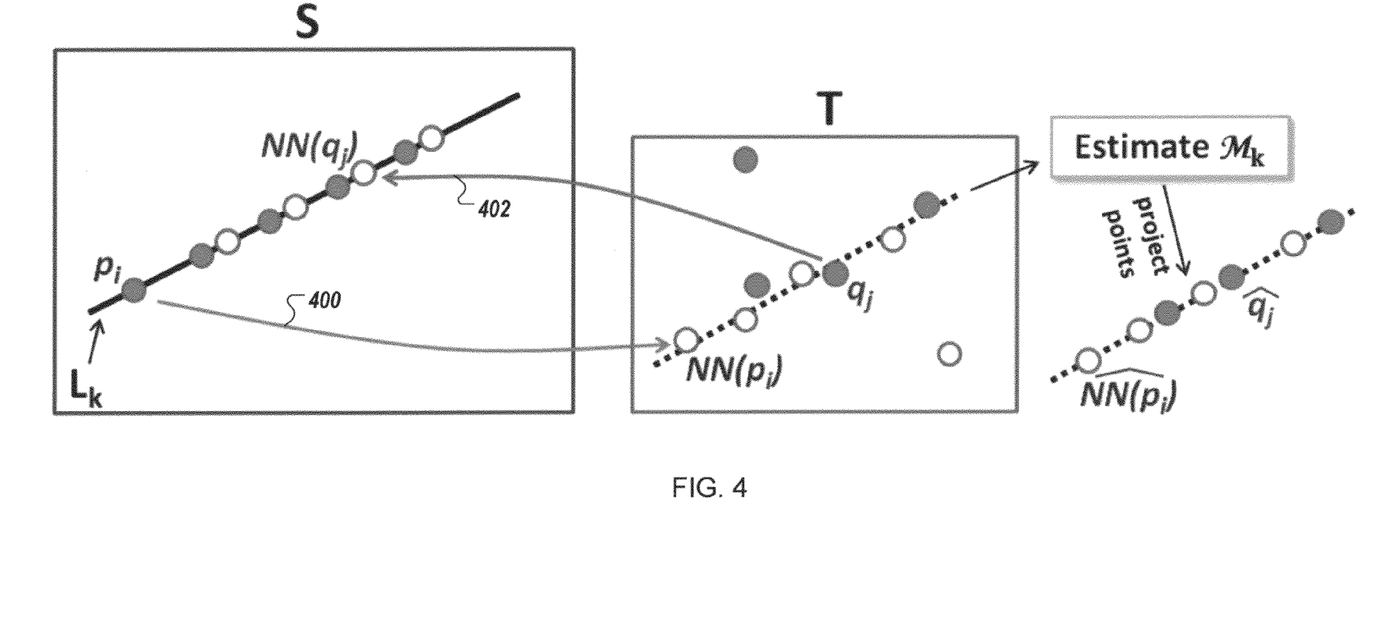
FIG. 4 schematically shows identification of contents for a modified image.

FIG. 4 schematically shows identification of contents for a modified image. Here, a source image S and a target image T are shown. In each iteration of the nearest-neighbor process, the bidirectional nearest-neighbor fields are calculated for all points in the source and target images. Particularly, the target image is to be generated as a representation of the source image, for example as a retargeting to change the aspect ratio thereof. The source image can include one or more features noticeable to a viewer. Here, one such feature is schematically illustrated using a straight line $L_k$ in the source image. The source image includes a large number of points (e.g., patch centers, the range of the mapping function $f$) that can be grouped in patches for image processing. Here, the points that lie on the line $L_k$ are collectively referred to as $p_i$, where the index i denotes an arbitrary number of individual points.

Here, for any point $p_i$ the nearest neighbor in the target image is denoted $NN(p_i)$ and the mapping is schematically illustrated using an arrow 400. The nearest-neighbor process also identifies the nearest neighbors in the source image for each point in the target image. Particularly, the target image is to include a straight line that represents the line $L_k$. Similarly to the points $p_i$, the points in the target image whose nearest neighbors in the source image lie on the line $L_k$ are collectively referred to as $q_i$. That is, for any arbitrary point $q_i$ in the target image, the nearest neighbor in the source image is a point denoted $NN(q_i)$ that lies on the line $L_k$. Similarly, this mapping is schematically illustrated using an arrow 402.

In the nearest-neighbor process, all points $NN(p_i)$ and $q_i$ in the target image are collected. The objective is to minimize a distance function with regard to the points in the source and target images. The distance function can be minimized using models that represent the preservation of features of interest to viewers. A model can take points and nearest-neighbor points as inputs. For example, K number of models $M_k$ can be created, where k∈K. The distance function can be minimized so that each model equals zero, that is:

$$M_k(p_i, NN(p_i), q_j, NN(q_j)) = 0$$

For example, a model can relate to a feature in the source image that is a straight line. Assume that the line has been identified, either by a user or (semi)automatically, for example as described above. Then, satisfying the model means that the dot product of the line's three-vector (denoted 1, in homogeneous coordinates) and all the points in the target image should be zero. That is:

$$NN(p_i)^T \cdot l = 0$$

In some implementations, the feature in the source image can be a parametric-equation line. For example, a parabola can appear in an image that depicts a rope hanging from its ends or a wire of a suspension bridge. The parametric equation can define the shape of the rope or wire. The constraint then defines a parametric equation for the second feature, for example such that the rope or wire appears natural to the viewer.

In some implementations, the feature in the target image can be generated by a scaling of a feature in the source image. A uniform scaling can be applied to ensure that no proportion of the feature is changed. For example, a human figure can be marked and thereby associated with the constraint that no proportions of the figure are to be changed in the processing.

A non-uniform scaling can be applied to ensure that at least one proportion of the feature is changed, and that at least one other proportion of the feature is not changed. For example, a building façade can be marked and thereby associated with the constraint that its height, but not its width, can be modified in the processing.

In some implementations, two or more features can be tied to ensure that a common scaling is performed. For example, two objects in the source image can be marked and thereby associated with the constraint that the same scaling is to be performed on the objects.

In some implementations, the kind(s) of transformation to be applied can be constrained. For example, a feature can be marked in the source image and thereby associated with the constraint that the corresponding feature in the target image is to be an affine transformation thereof.

In some implementations, the constraint specifies an aspect of the second feature based on the first feature. For example, the shape of a feature in the source image S can be an arbitrary curve and the shape of a corresponding feature in the target image T can be a straight line. That is, a user can identify a curve in the source image to define that the curve should become a straight line in the target image. In some implementations, this can be used for correcting geometric distortions, or residual distortions that remain after standard correction. One advantage of such an approach is that texture is preserved.

The following are additional examples of constraints. The shape of a feature in the source image S can be a straight line and the shape of a corresponding feature in the target image T can be an arbitrary curve. The shape of a feature in the source image S can be an arbitrary curve and the shape of a corresponding feature in the target image T can be a different arbitrary curve. The target image T can be generated so that a feature in the source image S is distorted by at most a predetermined amount, such as that points in the target image are located no further than ten points from their source location. The constraint can specify a nonlinear transformation that is applied to a feature in the source image S to generate a corresponding feature in the target image T. The constraint can specify orthogonality or parallelism between two or more lines. The constraint can define an epipole point in an image through which point all parallel lines or their continuations should pass.

Another example is that the feature in the source image is a region and the target image is created using a homography transformation H. Then, satisfying the model means that the distance of all projected points and the corresponding NN points in the target image should be zero. That is:

$$H_k p_i - NN(p_i) = 0$$

In implementations where the constraint specifies a straight line in the target image, a line $M_k$ is generated in the target image. For example, the line $M_k$ can be calculated as the straight line that best conforms to the points NNW and $q_j$. The points $NN(p_i)$ and $q_j$ in the target image are then projected to the line $M_k$. For example, each of the points $NN(p_i)$ and $q_j$ that is not already on the line $M_k$ can be relocated there along a normal of the line $M_k$. Here, the projected points are referred to as $\widehat{NN(p_i)}$ and $\widehat{q_j}$, respectively.

In other implementations where the constraint defines the feature in the target image other than as a straight line, a corresponding model for such aspect is used. That is, $M_k$ in the above example is the model used for a straight line in the target image.

The semantic constraint(s) are taken into account as follows. During a gradual scaling process lines and regions of the source image may deform only gradually due to a lack of space. This implies that these deformations can be corrected using very small adjustments after each iteration. To satisfy the semantic constraint(s), an iterative correction scheme can be applied. For example, the Random Sample Consensus (RANSAC) algorithm can be applied to perform an estimation after each iteration. It can be assumed that in each iteration most of the locations of $NN(p_i)$ and $q_j$ almost satisfy the desired one of the models $M_k$, and this model can be estimated by discarding outliers among the points. Similarly, the outliers are ignored when performing reprojection. For example, if the feature to be preserved is a region, outlier points can be corrected; if the feature is a line, outliers can be excluded from the process. Thus, the estimated model is used to project the points of the target image onto $\widehat{NN(p_i)}$ and $\widehat{q_j}$, respectively, and to correct the nearest-neighbor fields accordingly. Accordingly, a nearest-neighbor algorithm, model fitting and projection can be repeated iteratively in the inner loop of a bidirectional similarity algorithm.

In some implementations, if the transformation subject to the constraint is too extreme (e.g., the scale, shear or rotation is too large), the input image patches from the initial image 106A might not be good enough for synthesis, and can be scaled, sheared or rotated accordingly to generated the modified image 106B. For example, a scaling of 20% or more, and/or a rotation angle of 15 degrees or more, and/or a shear of 20% or more, can be considered too large in some implementations.

In short, the line $M_k$ is created in the target image to represent the line $L_k$ in the source image. That is, the semantic constraint that the line $L_k$ is to remain straight in the retargeting is taken into account and the line $M_k$ can then be generated without having unwanted artifacts.

In some implementations patch sizes can be varied when image reconstruction is performed using one or more constraints. It was mentioned above that for large scalings, shears or rotations, one may need to scale, shear or rotate patches. When the scalings, shears or rotations are not too large, small patches can be used on or nearby the constrained region or line, while larger patches are used elsewhere in the image. In some implementations, a small patch can be a p5×5 patch as opposed to, say, a 7×7 or a 13×13 patch. For example, smaller patches can be more usable for scalings, shears or rotations than large patches by rearranging the locations of the small patches. Large patches, on the other hand, can better preserve structure and textures of the image.

Figure 5:
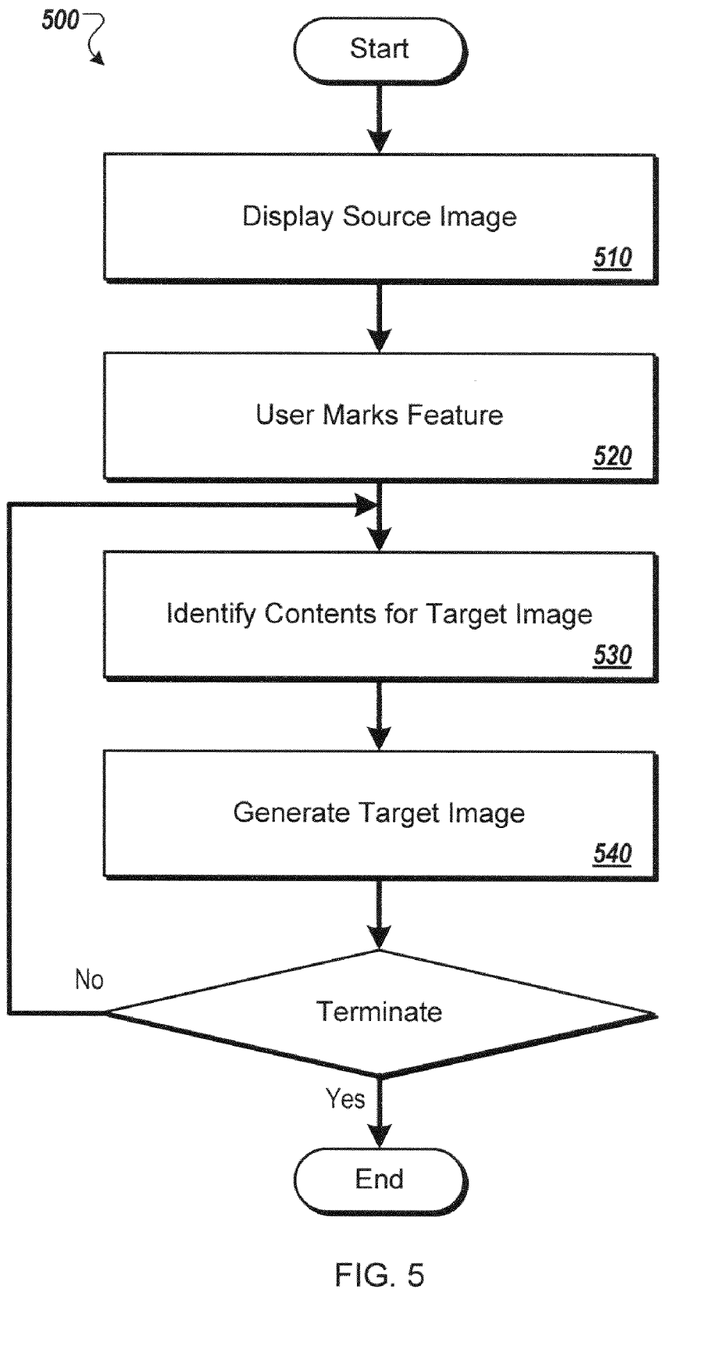
FIG. 5 shows an example method of generating a modified image.

FIG. 5 shows an example method 500 of generating a modified image. The method 500 can be performed by a processor executing instructions stored in a tangible computer-readable medium, for example in the system 100 (FIG. 1). One or more additional steps can be performed.

Step 510 involves initiating, in a computer device, a similarity algorithm for using a first image to generate a second image. For example, the similarity algorithm can be bidirectional or unidirectional and performed by the system 100 (FIG. 1).

Step 520 involves identifying, in the computer device, a first feature of a first image. The identification corresponds to a constraint on the first feature for generating a second image. The constraint restricts at least one of location and geometric orientation in the second image of patches representing the first feature. For example, the user can mark any or all of the lines 206A-E (FIG. 2) using the input device 110. As another example, any or all of the lines 206A-E can be identified automatically or semi-automatically.

At least steps 530 and 540 of the method 500 are performed iteratively multiple times, each time improving the similarity. For example, the iterations can be performed until a desired image size is reached.

Step 530 involves identifying, using the computer device, contents for the second image by performing a nearest-neighbor process on patches in the image in iterations of the similarity algorithm. The nearest-neighbor process complies with the constraint. For example, the system 100 can perform nearest-neighbor processing on patches in the images 106A, 200A, 300A and/or the source image S.

Step 540 involves generating the second image from the identified contents based on the iterations of the similarity algorithm. The second image includes a second feature generated to represent the first feature and complying with the constraint. For example, the system 100 can generate any or all of the images 106B (FIG. 1), 200C (FIG. 2), 300C (FIG. 3), or the target image T (FIG. 4).

After step 540, the method 500 can terminate or repeat steps 530 and 540. For example, the method will terminate if a criterion for ending the similarity process is met. After the method 500 terminates other operations can be performed, such as storing or outputting the generated image.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for generating a modified image, the method comprising:
   initiating, in a computer device, a patch-based optimization algorithm for using a first image to generate a second image;
   identifying, in a computer device, a first feature of a first image, the identification corresponding to a constraint on the first feature for generating a second image, the constraint restricting at least one of location and geometric orientation in the second image of patches representing the first feature;
   identifying, using the computer device, contents for the second image by processing patches in the image in iterations of the patch-based optimization algorithm, the patch-based optimization complying with the constraint; and
   generating the second image from the identified contents based on the iterations of the patch-based optimization algorithm, the second image including a second feature generated to represent the first feature and complying with the constraint;
   wherein the first feature is defined by a parametric-equation line, and wherein the constraint generates a parametric equation that defines the second feature.

2. The method of claim 1, further comprising:
   displaying the first image to a user using the computer device; and
   receiving an input from the user that marks the first feature in the first image, wherein the first feature is identified based on the input.

3. The method of claim 1, wherein the first feature is automatically identified in the first image without explicit user input.

4. The method of claim 3, further comprising: receiving an input from the user that modifies the constraint; and
   wherein the second image is generated based also on the input.

5. The method of claim 1, wherein the patch-based optimization algorithm includes fitting a parametric model to the patches and iteratively performing projections using the model to fix locations in the second image for at least some of the patches.

6. The method of claim 5, wherein the first feature includes a straight line and wherein the constraint comprises that the second feature include at least part of the straight line.

7. The method of claim 6, wherein the constraint and the parametric model do not restrict a translation and a slope of the straight line in the second image with regard to the first image.

8. The method of claim 6, wherein the constraint and the parametric model restrict the straight line in the second image to have a same slope as in the first image, and wherein the constraint and the parametric model do not restrict a translation of the straight line in the second image with regard to the first image.

9. The method of claim 6, wherein the input further specifies a location where to place the second feature in the second image, and wherein the constraint and the parametric model restrict the straight line in the second image to have a same slope as in the first image.

10. The method of claim 5, wherein the first feature includes a region of the first image, and wherein the constraint and the parametric model provide that the region is translated to a location in the second image without any deformation.

11. The method of claim 1, wherein the constraint comprises that the second feature is generated by a uniform scaling of the first feature.

12. The method of claim 1, wherein the constraint comprises that the second feature is generated by a non-uniform scaling of the first feature that changes at least one proportion of the first feature and does not change at least one other proportion of the first feature.

13. The method of claim 1, wherein the first image includes also a third feature for which a corresponding fourth feature is included in the second image, and wherein the constraint comprises that the second and fourth features are generated by a common scaling of the first and third features, respectively.

14. The method of claim 1, wherein the constraint restricts the second feature to be an affine transformation of the first feature.

15. The method of claim 1, wherein the constraint specifies an aspect of the second feature based on the first feature.

16. The method of claim 15, wherein the constraint includes at least one selected from:
   the shape of the first feature is an arbitrary curve and the shape of the second feature is a straight line;
   the shape of the first feature is a straight line and the shape of the second feature is an arbitrary curve;
   the shape of the first feature is an arbitrary curve and the shape of the second feature is a different arbitrary curve;
   the second feature corresponds to at most a predefined amount of distortion of the first feature;
   the second feature corresponds to a nonlinear transformation of the first feature; and
   definition of an epipole point in the second image through which point all parallel lines or their continuations should pass.

17. The method of claim 1, wherein identifying the contents for the second image comprises:
   identifying each second-image point in the second image for which the patch-based optimization algorithm identifies a first-image point in the first feature;
   computing the second feature in the second image based on the identified second-image points; and
   projecting the identified second-image points to the second feature in the second image.

18. The method of claim 17, wherein the first feature includes a straight line and wherein identifying the contents for the second image further comprises:
   determining a three-vector for the straight line; and ensuring that a dot product of the three-vector and all points in the second feature equals zero.

19. The method of claim 18, wherein the first feature includes a region and wherein identifying the contents for the second image further comprises:
determining a homography transformation of each point in the first feature; and
ensuring that a distance between:
(i) the homography transformations of all points in the first feature equal to points in the second image, and
(ii) all points in the second feature equals zero.

20. The method of claim 1, wherein the second image comprises a retargeting of the first image.

21. The method of claim 1, wherein the constraint limits available locations in the second image for placing the patches of the first feature.

22. The method of claim 1, wherein the patch-based optimization algorithm comprises:
(1) initializing the second image to be equal to the first image;
(2) subsampling the first and second images to a coarsest resolution;
(3) resizing, at the coarsest resolution, the second image by a scale factor using linear interpolation;
(4) computing a nearest-neighbor field in at least one of (i) a direction from the first image to the second image and (ii) a direction from the second image to the first image;
(5) fitting a parametric model to the patches and their nearest-neighbor locations, and performing projections using the parametric model to fix locations in the second image for at least some of the patches;
(6) computing a new second image by copying and averaging colors from nearest-neighbor patches;
(7) repeating steps (4)-(6) until a convergence criterion is met;
(8) repeating, at the coarsest resolution, steps (3)-(7) until a desired output ratio of the second image is reached; and
(9) upscaling to a finer resolution and repeating steps (3)-(8) until reaching an original resolution of the first image.

23. The method of claim 1, wherein the second image represents a reshuffling of the first image.

24. The method of claim 23, wherein the patch-based optimization algorithm comprises:
(1) initializing the second image to be equal to the first image;
(2) subsampling the first and second images to a coarsest resolution;
(3) reshuffling, at the coarsest resolution, the second image;
(4) computing a nearest-neighbor field in at least one of (i) a direction from the first image to the second image and (ii) a direction from the second image to the first image;
(5) fitting a parametric model to the patches and their nearest-neighbor locations, and performing projections using the parametric model to fix locations in the second image for at least some of the patches;
(6) computing a new second image by copying and averaging colors from nearest-neighbor patches;
(7) repeating steps (4)-(6) until a convergence criterion is met; and
(8) upscaling to a finer resolution and repeating steps (3)-(7) until reaching an original resolution of the first image.

25. The method of claim 1, wherein the second image represents an image warping of the first image that preserves texture of the first image.

26. The method of claim 1, wherein the patch-based optimization algorithm uses patches of the first image that have more than one size.

27. A computer program product tangibly embodied in a tangible program carrier and comprising instructions that when executed by a processor perform a method comprising:
initiating, in a computer device, a patch-based optimization algorithm for using a first image to generate a second image;
identifying, in a computer device, a first feature of a first image, the identification corresponding to a constraint on the first feature for generating a second image, the constraint restricting at least one of location and geometric orientation in the second image of patches representing the first feature;
identifying, using the computer device, contents for the second image by processing patches in the image in iterations of the patch-based optimization algorithm, the patch-based optimization complying with the constraint; and
generating the second image from the identified contents based on the iterations of the patch-based optimization algorithm, the second image including a second feature generated to represent the first feature and complying with the constraint;
wherein the first feature is defined by a parametric-equation line, and wherein the constraint generates a parametric equation that defines the second feature.

28. A computer program product tangibly embodied in a computer-readable storage medium, the computer program product including instructions that, when executed, generate on a display device a graphical user interface comprising:
an image display area displaying to a user a first image that is to be used in generating a second image that represents the first image;
an input control for the user to generate an input that marks a first feature of the first image, the input representing a constraint on the first feature for generating the second image, the constraint restricting at least one of location and geometric orientation in the second image of patches representing the first feature;
wherein contents for the second image are identified using a patch-based optimization algorithm applied to patches in the image, the patch-based optimization algorithm complying with the constraint, and the second image is generated using the identified contents, the second image including a second feature generated to represent the first feature and complying with the constraint, wherein the first feature is defined by a parametric-equation line, and wherein the constraint generates a parametric equation that defines the second feature.

29. The computer program product of claim 28, wherein the first feature includes a straight line, and wherein the input control comprises a drawing tool with which the user marks the straight line representing the constraint.

30. The computer program product of claim 28, wherein the first feature includes a region of the first image, and wherein the input control comprises a drawing tool with which the user marks the region representing the constraint.

31. A system comprising:
one or more processors; and
a computer program product tangibly embodied in a tangible program carrier and comprising instructions that when executed by a processor perform a method comprising:
  initiating, in a computer device, a patch-based optimization algorithm for using a first image to generate a second image;
  identifying, in a computer device, a first feature of a first image, the identification corresponding to a constraint on the first feature for generating a second image, the constraint restricting at least one of location and geometric orientation in the second image of patches representing the first feature;
  identifying, using the computer device, contents for the second image by processing patches in the image in iterations of the patch-based optimization algorithm, the patch-based optimization complying with the constraint; and
  generating the second image from the identified contents based on the iterations of the patch-based optimization algorithm, the second image including a second feature generated to represent the first feature and complying with the constraint;
  wherein the first feature is defined by a parametric-equation line, and wherein the constraint generates a parametric equation that defines the second feature.

* * * * *

UNITED STATES PATENT AND TRADEMARK OFFICE
CERTIFICATE OF CORRECTION

PATENT NO. : 8,355,592 B1  
APPLICATION NO. : 12/454661  
DATED : January 15, 2013  
INVENTOR(S) : Eli Shechtman and Dan Goldman Page 1 of 1

It is certified that error appears in the above-identified patent and that said Letters Patent is hereby corrected as shown below:

On the Title Page:

Below the paragraph beginning with "(22)" and ending with "Filed: May 21, 2009" insert the following paragraph:

--Related U.S. Application Data  
(60) Provisional application no. 61/215,464, filed on May 6, 2009--

Signed and Sealed this  
Ninth Day of April, 2013

Teresa Stanek Rea  
*Acting Director of the United States Patent and Trademark Office*